United States Patent
Takeshita et al.

(10) Patent No.: US 7,701,812 B2
(45) Date of Patent: Apr. 20, 2010

(54) OPTICAL ELEMENT DRIVING APPARATUS

(75) Inventors: Nobuo Takeshita, Tokyo (JP); Toshiya Matozaki, Tokyo (JP); Keiji Nakamura, Tokyo (JP); Mitoru Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 591 days.

(21) Appl. No.: 11/703,738

(22) Filed: Feb. 8, 2007

(65) Prior Publication Data

US 2008/0192365 A1    Aug. 14, 2008

(51) Int. Cl.
   *G11B 7/00*  (2006.01)
(52) U.S. Cl. ................... 369/44.22; 369/44.15
(58) Field of Classification Search ............... None
   See application file for complete search history.

(56) References Cited

U.S. PATENT DOCUMENTS

| | | | | |
|---|---|---|---|---|
| 5,930,214 A | * | 7/1999 | Kasahara et al. | 369/53.2 |
| 5,986,984 A | * | 11/1999 | Nakamura et al. | 369/44.23 |
| 7,561,498 B2 | * | 7/2009 | Kim et al. | 369/44.15 |
| 2009/0016178 A1 | * | 1/2009 | Kim et al. | 369/44.15 |

FOREIGN PATENT DOCUMENTS

| | | |
|---|---|---|
| JP | 4-313824 A | 11/1992 |
| JP | 6-333255 A | 12/1994 |
| JP | 9-171630 A | 6/1997 |
| JP | 11-120572 A | 4/1999 |
| JP | 2003-346363 A | 12/2003 |
| JP | 3544760 B2 | 4/2004 |
| JP | 2005-18837 A | 1/2005 |

* cited by examiner

*Primary Examiner*—Paul Huber
(74) *Attorney, Agent, or Firm*—Birch, Stewart, Kolasch & Birch, LLP

(57) ABSTRACT

An optical element driving apparatus includes a holder that holds a plurality of switchable optical elements for focusing light on a recording medium, a resiliently deformable supporting unit that supports the holder, a focusing driving unit that drives the holder in a direction of optical axes of the optical elements, and a tracking driving unit that drives the holder in a tracking direction perpendicular to the direction of the optical axes. The switching of the optical elements is performed by moving the holder by means of the tracking driving unit, so as to select one of the optical elements that focuses light on the recording medium.

8 Claims, 14 Drawing Sheets

FIG.1
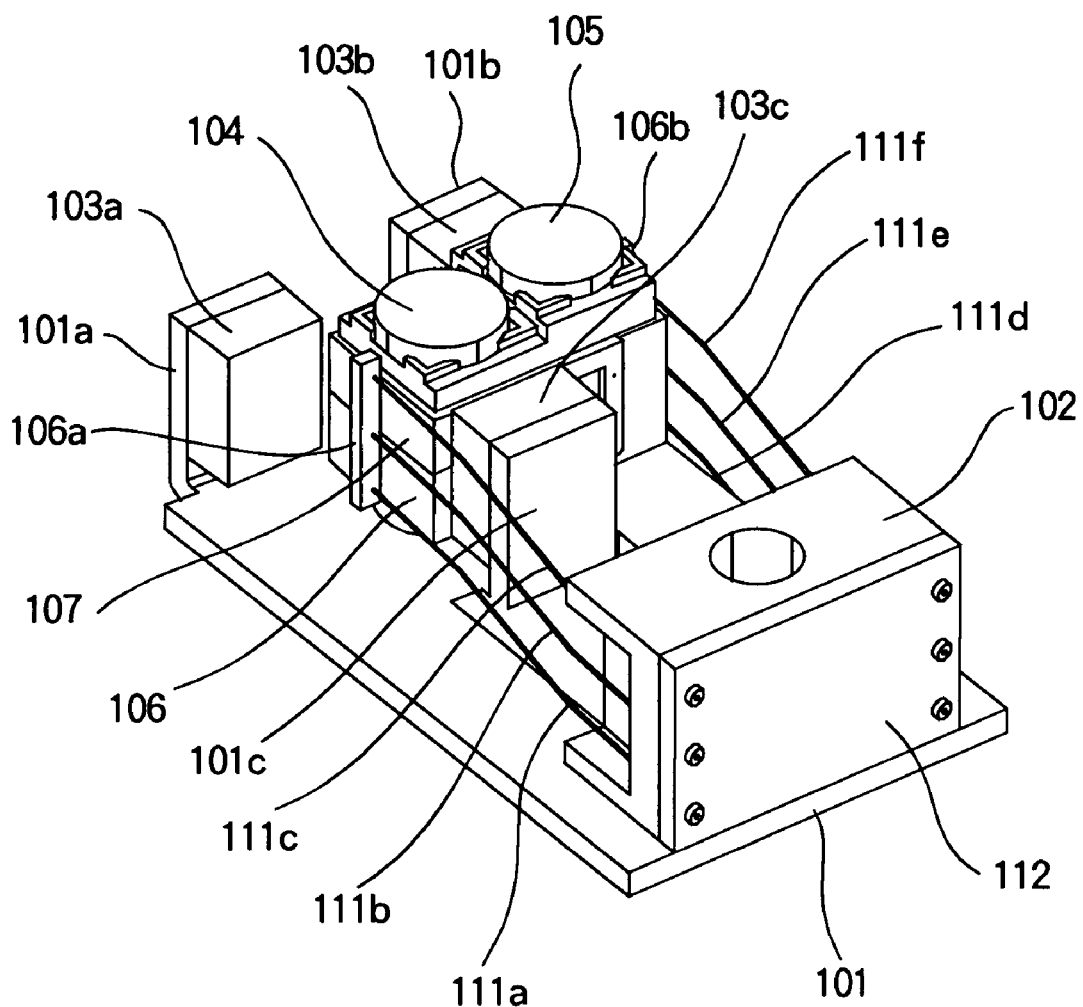
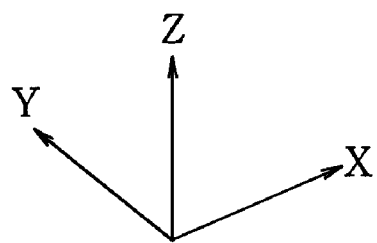

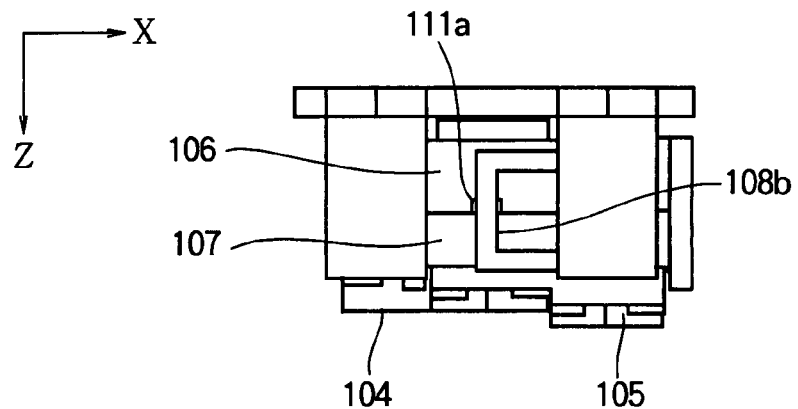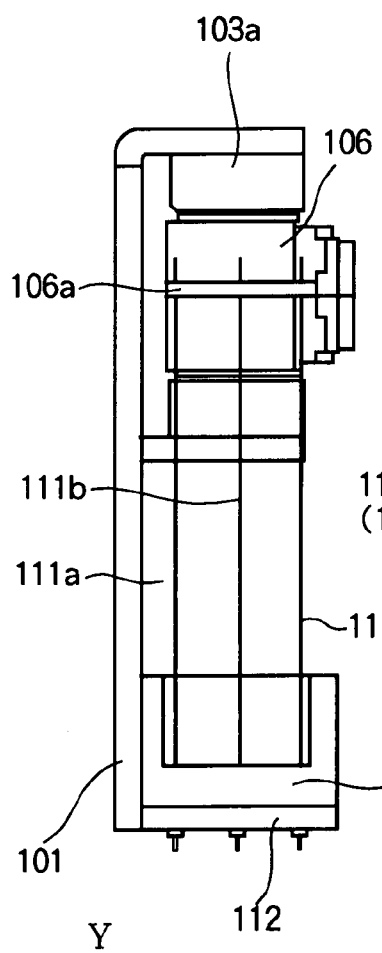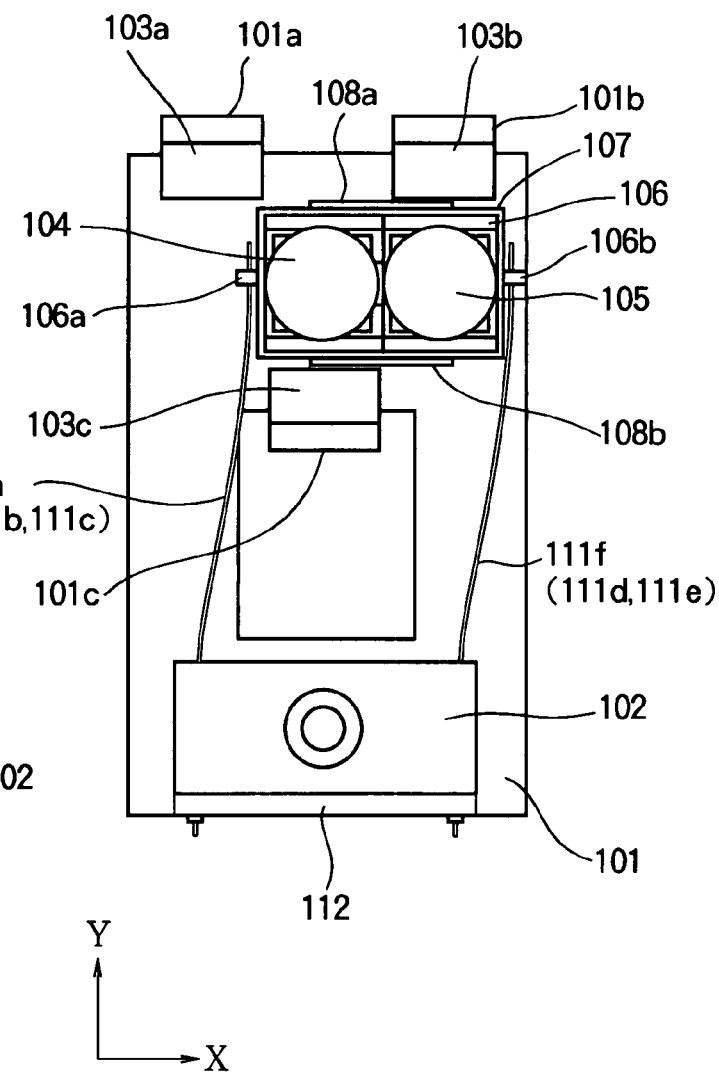

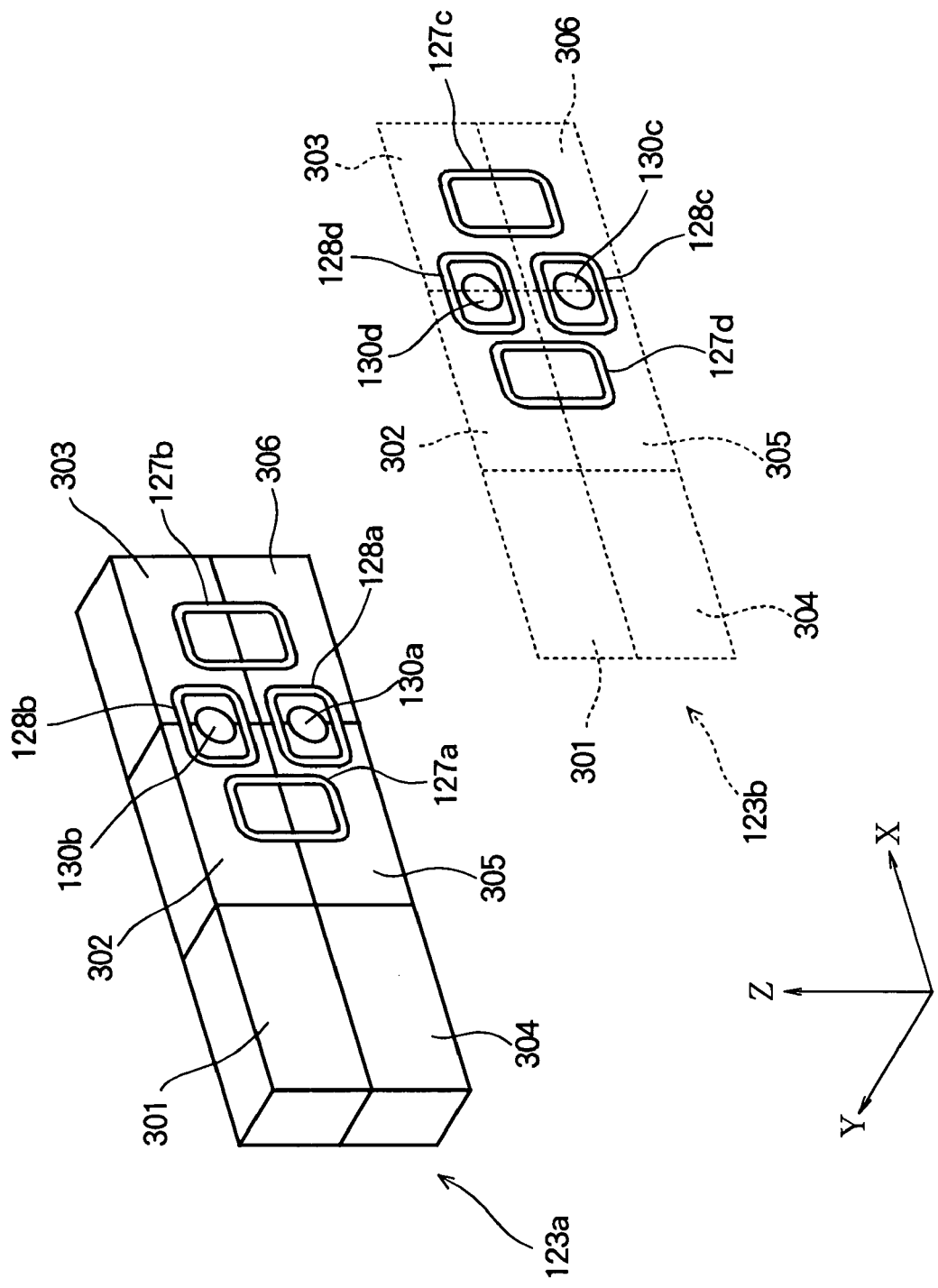

OPTICAL ELEMENT DRIVING APPARATUS

BACKGROUND OF THE INVENTION

This invention relates to a driving apparatus for driving an optical element (such as an objective lens) used in a device for recording information on or reproducing information from an information recording medium, such as a DVD (Digital Versatile Disc) recorder or the like.

Recently, an optical disk device adaptable to plural kinds of optical disks is being developed. In such an optical disk device, it is necessary to form a beam spot having a suitable shape for the kind of optical disk. Therefore, the optical disk device has a plurality of objective lenses, and is configured to switch the objective lenses in accordance with the kinds of optical disks. The switching of the objective lenses is performed by sliding an entire body of an objective lens driving apparatus (on which a plurality of the objective lenses are mounted) in a tracking direction. Such an apparatus is disclosed in, for example, Japanese Laid-Open Patent Publication No. 9-81947 (in particular, Pages 1 to 8 and FIG. 1 to 6).

However, in the above described conventional apparatus, when the switching of the objective lenses is performed, it is necessary to move relatively heavy weight components (such as a supporting rod and a fixing member) in the tracking direction, as well as light weight components such as objective lenses and a lens holder. Therefore, a large driving force is necessary, with the result that a large-scale apparatus is necessary.

SUMMARY OF THE INVENTION

An object of the present invention is to provide an optical element driving apparatus capable of switching optical elements with a relatively small driving force.

The present invention provides an optical element driving apparatus including a holder that holds a plurality of switchable optical elements for focusing light on a recording medium, a supporting unit that supports the holder, the supporting unit being resiliently deformable, a focusing driving unit that drives the holder in a direction of optical axes of the optical elements, and a tracking driving unit that drives the holder in a tracking direction perpendicular to the direction of the optical axes. The switching of the optical elements is performed by moving the holder by means of the tracking driving unit, so as to select one of the optical elements that focuses light on the recording medium.

With such an arrangement, the switching of the optical elements can be performed by the tracking driving unit that moves the holder (on which the optical elements such as objective lenses are mounted) in the tracking direction. Therefore, it is not necessary to move the heavy weight components, with the result that the switching of the optical elements can be performed with a simple configuration. Since it is not necessary to provide an exclusive mechanism for switching the optical elements, a low-cost and small optical element driving apparatus can be obtained.

BRIEF DESCRIPTION OF THE DRAWINGS

In the attached drawings:

FIG. 1 is a perspective view showing an optical element driving apparatus according to Embodiment 1 of the present invention in a state where the optical element driving apparatus selects one of optical elements;

FIGS. 2A, 2B and 2C are respectively a front view, a side view and a plan view of the optical element driving apparatus shown in FIG. 1;

FIG. 14 is a perspective view showing the positional relationship between a magnet and respective coils of the optical element driving apparatus shown in FIG. 8A.

DETAILED DESCRIPTION OF THE PREFERRED EMBODIMENT

Embodiments of the present invention will be described with reference to the attached drawings.

Embodiment 1

Figure 3:
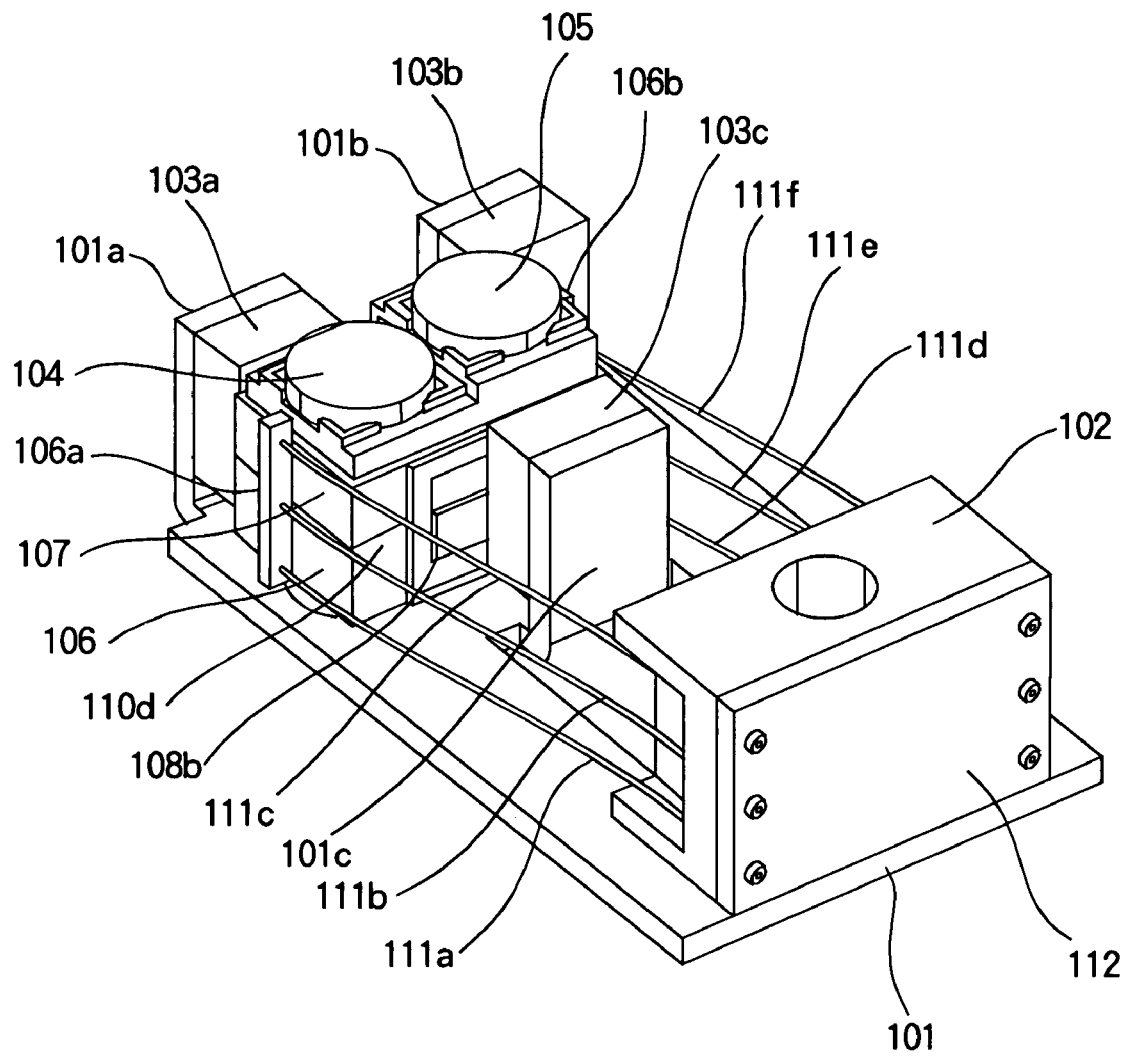
FIG. 3 is a perspective view showing the optical element driving apparatus shown in FIG. 1 in a state where the optical element driving apparatus selects the other of the optical elements.
Figure 4A:
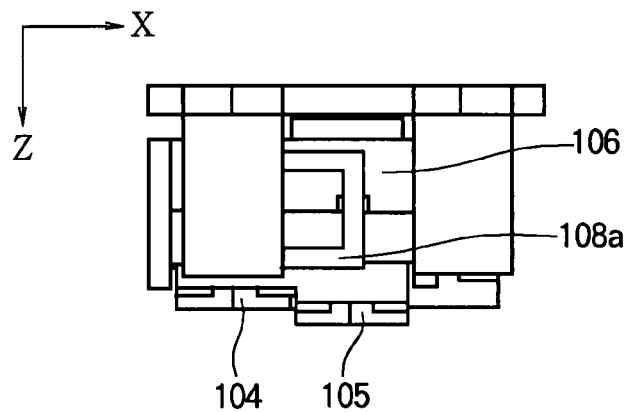
FIGS. 4A, 4B and 4C are respectively a front view, a side view and a plan view of the optical element driving apparatus corresponding to FIG. 3.
Figure 4B:
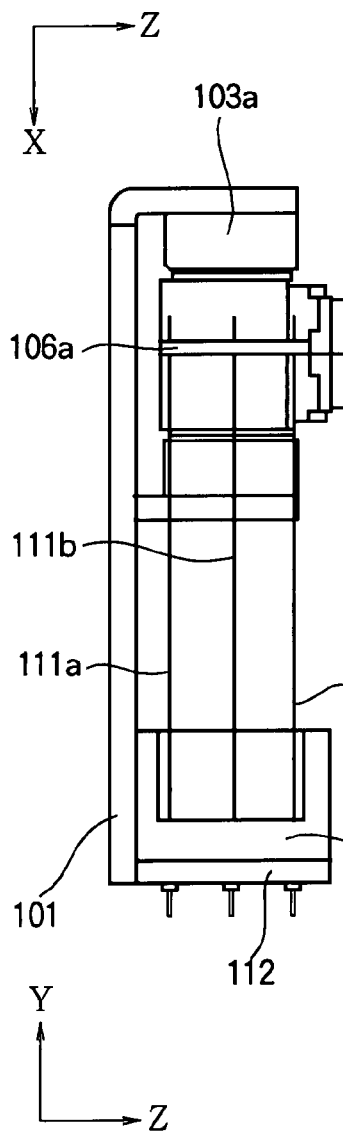
Figure 4C:
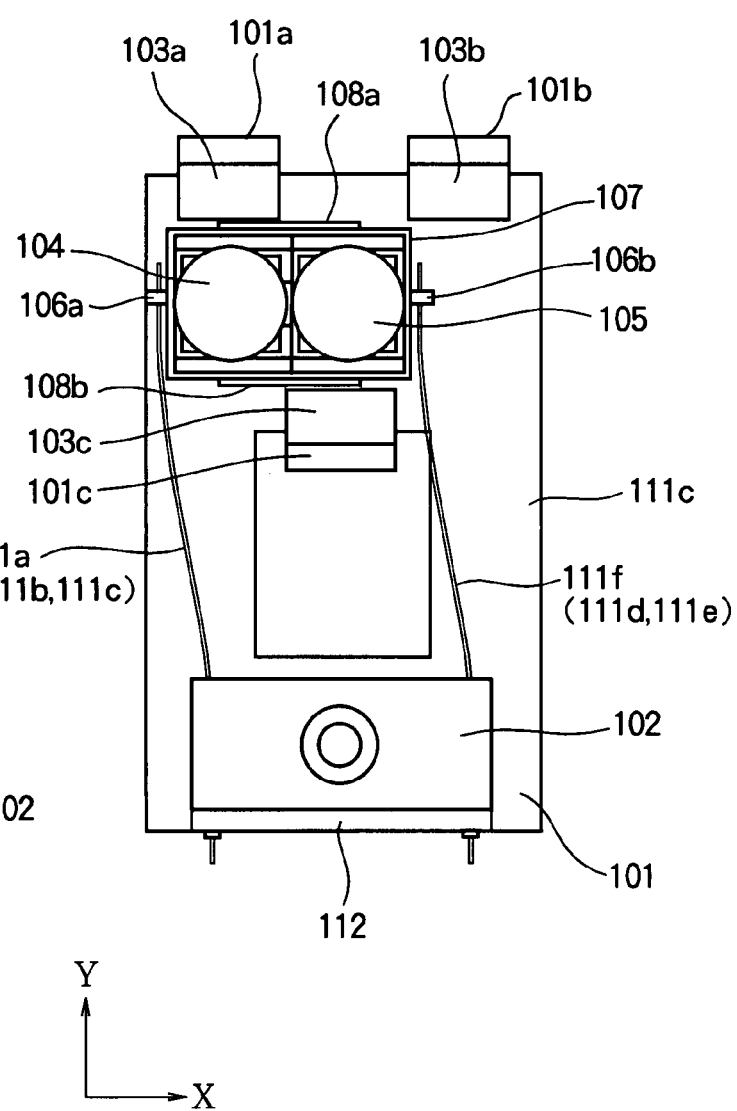
Figure 5:
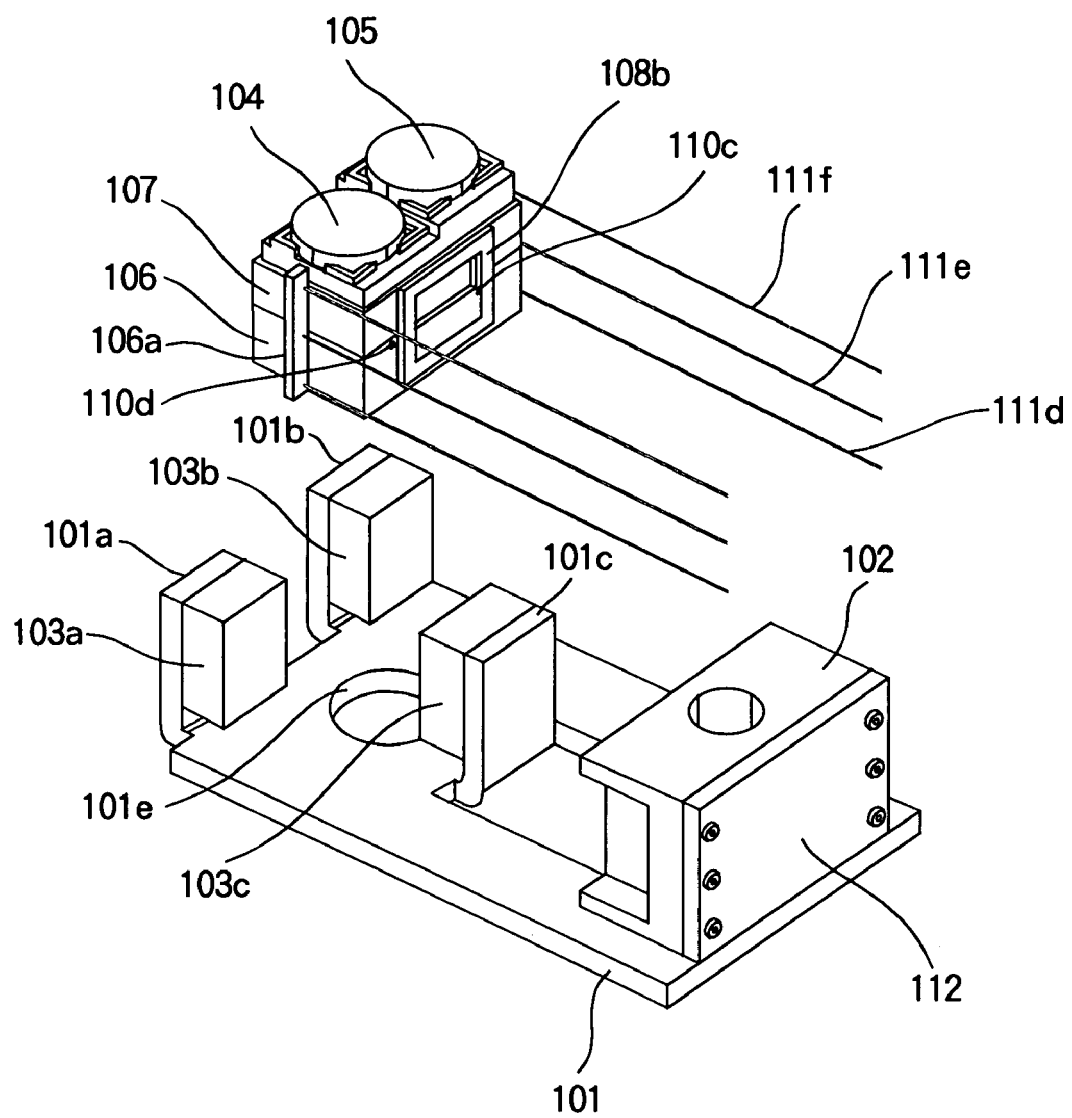
FIG. 5 is a perspective view showing the optical element driving apparatus shown in FIG. 1 in such a manner that the optical element driving apparatus is divided into a movable part and a stationary part.
Figure 6:
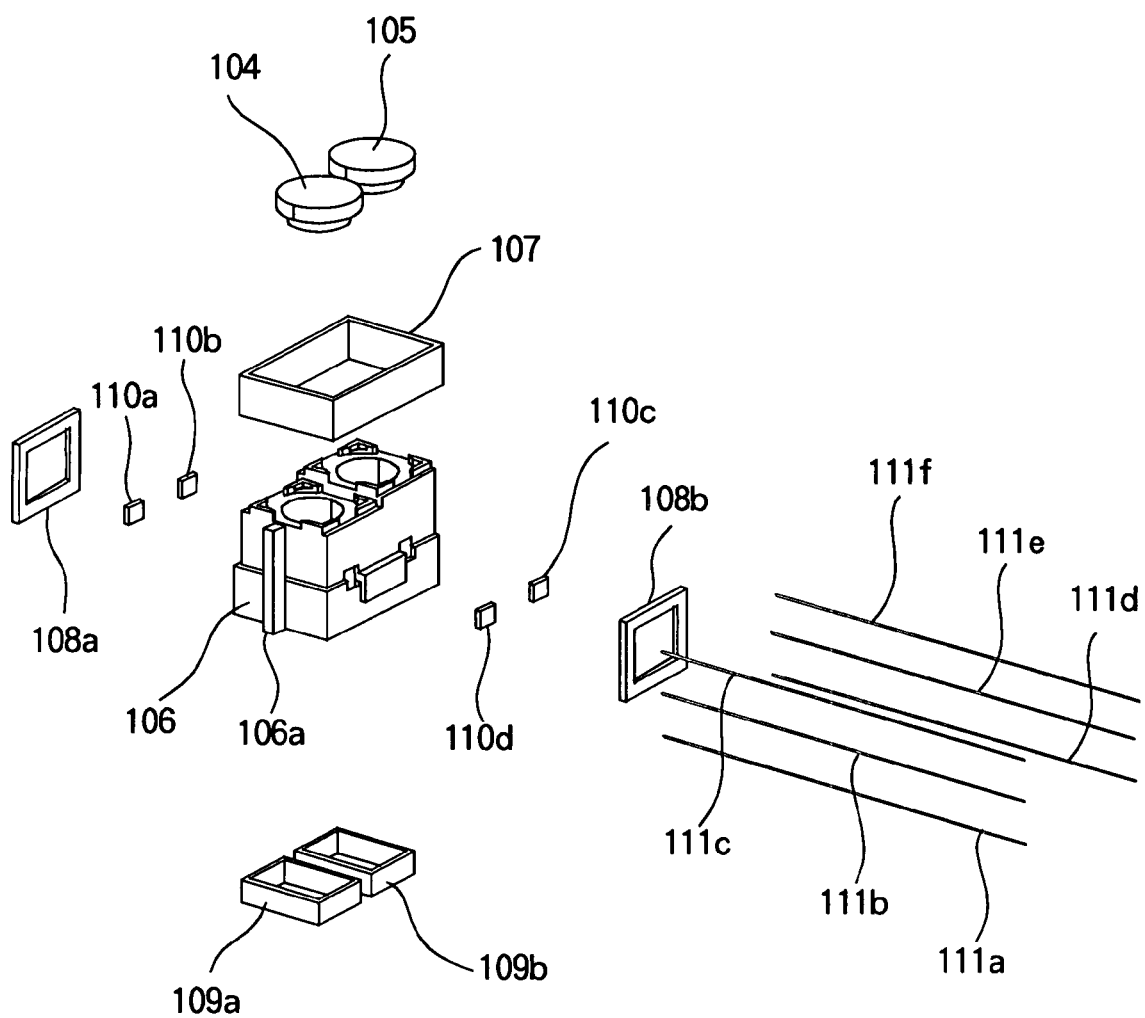
FIG. 6 is an exploded perspective view showing the movable part of the optical element driving apparatus shown in FIG. 5.

FIG. 1 is a perspective view showing an optical element driving apparatus according to Embodiment 1 of the present invention in a state where the optical element driving apparatus selects one of two optical elements. FIGS. 2A, 2B and 2C are respectively a front view, a side view and a plan view of the optical element driving apparatus shown in FIG. 1. FIG. 3 is a perspective view showing the optical element driving apparatus shown in FIG. 1 in a state where the optical element driving apparatus selects the other of the optical elements. FIGS. 4A, 4B and 4C are respectively a front view, a side view and a plan view of the optical element driving apparatus corresponding to FIG. 3. FIG. 5 is a perspective view showing the optical element driving apparatus in such a manner that the optical element driving apparatus is divided into a movable part and a stationary part. FIG. 6 is an exploded perspective view showing the movable part of the optical element driving apparatus shown in FIG. 5.

As shown in FIG. 1, the optical element driving apparatus of Embodiment 1 includes a base 101, a support 102 provided on the base 101, a lens holder 106 substantially in the form of a rectangular parallelepiped resiliently supported by the support 102 via wires (described later), and objective lenses (i.e., optical elements) 104 and 105 mounted on the lens holder 106. The objective lenses 104 and 105 are mounted on the lens holder 106 so that the objective lenses 104 and 105 are adjacent to each other and so that the optical axes of the objective lenses 104 and 105 are parallel to each other. The lens holder 106 supports the objective lenses 104 and 105 in such a manner that the optical axes of the objective lenses 104 and 105 are perpendicular to a recording surface of an optical disk (i.e., a recording medium), i.e., in such a manner that the optical axes of the objective lenses 104 and 105 are parallel to a rotating axis of the optical disk.

Hereinafter, the direction of the optical axes of the objective lenses 104 and 105 (i.e., the direction perpendicular to the recording surface of the optical disk) is defined as Z-direction. Along the Z-direction, the direction toward the optical disk (from the objective lenses 104 and 105) is defined as "upward", and the opposite direction is defined as "downward". The direction in which the objective lenses 104 and 105 are arranged, i.e., the direction of a line connecting the centers of the objective lenses 104 and 105 is defined as X-direction. The direction perpendicular to both of the X-direction and the Z-direction is defined as Y-direction. The X-direction coincides with the direction of radius of the optical disk passing through the centers of optical lenses 104 and 105 (i.e., the tracking direction). The Y-direction coincides with the direction of the track of the optical disk.

The objective lenses 104 and 105 are configured to focus light on the optical disk, and are adaptable to the different kinds of optical disks. For example, the objective lens 104 is used for a blu-ray disk, and the objective lens 105 is used for other disk format. The objective lenses 104 and 105 are configured to form beam spots suitable for the optical disks for which the respective objective lenses 104 and 105 are used.

The base 101 is formed of a metal such as a magnetic body. The above described support 102 is formed on the upper surface of the base 101 and is disposed at an end of the base 101 in the Y-direction. A through-hole 101e (FIG. 5) is formed on the base 101, which allows the passage of light incident on the objective lens 104 or 105. The through-hole 101e is disposed in the vicinity of an end of the base 101 opposite to the support 102 side, and is disposed at the center of the base 101 in the X-direction.

Magnets 103a and 103b are disposed at the end of the base 101 opposite to the support 102 side. The magnets 103a and 103b are, for example, permanent magnets. The magnets 103a and 103b have magnetic pole-surfaces parallel to the XZ-plane, and the magnetic pole-surfaces face toward the support 102 side. The magnets 103a and 103b are disposed on both sides with respect to the center of the base 101 in the X-direction.

Further, another magnet 103c is disposed on the base 101, and is disposed at a position between the support 102 and the magnets 103a and 103b. The magnet 103c has a magnetic pole-surface parallel to the XZ-plane, and the magnetic pole-surface faces toward the magnets 103a and 103b side. The magnet 103c is disposed at the center of the base 101 in the X-direction.

The magnets 103a, 103b and 103c are so disposed that the lens holder 106 is sandwiched between the magnets 103a and 103b and the magnet 103c in the Y-direction. Further, the magnets 103a, 103b and 103c are respectively fixed to fixing walls 101a, 101b and 101c integrally formed with the base 101. The fixing walls 101a through 101c are formed by, for example, bending respective parts of the plate-shaped base 101.

As shown in FIGS. 2 and 3, six wires (resilient bodies) 111a, 111b, 111c, 111d, 111e and 111f having a electrical conductivity are fixed to both ends (in the X-direction) of the lens holder 106 so that three wires are fixed to each end of the lens holder 106. The wires 111a, 111b and 111c are arranged in the Z-direction. Tip ends of the wires 111a, 111b and 111c are fixed to a protrusion 106a formed on an end surface (in the X-direction) of the lens holder 106, i.e., a wall surface parallel to the YZ-plane. Tail ends of the wires 111a, 111b and 111c are fixed to a board 112 mounted on the support 102. Similarly, the wires 111d, 111e and 111f are arranged in the Z-direction. Tip ends of the wires 111d, 111e and 111f are fixed to a protrusion 106b formed on the other end surface (in the X-direction) of the lens holder 106, i.e., a wall surface parallel to the YZ-plane. Tail ends of the wires 111d, 111e and 111f are fixed to the board 112. The lens holder 106 is resiliently supported by the wires 111a through 111f with respect to the support 102.

By the resilient deformation of the wires 111a through 111f, the lens holder 106 is movable substantially in the X-direction between a position shown in FIG. 1 and a position shown in FIG. 3. When the lens holder 106 is in the position shown in FIG. 1, the objective lens 104 positions above the through hole 101e (FIG. 5). In this state, the recording of information on the optical disk, the reproducing of information from the optical disk, or both can be performed using the objective lens 104. When the lens holder 106 is in the position shown in FIG. 3, the objective lens 105 positions above the through hole 101e (FIG. 5). In this state, the recording of information on the optical disk, the reproducing of information from the optical disk, or both can be performed using the objective lens 105.

As shown in FIG. 6, the focusing coil 107 is fixed to the lens holder 106 in such a manner that the focusing coil 107 surrounds two wall surfaces parallel to the XZ-plane and two wall surfaces parallel to the YZ-plane of the lens holder 106. The focusing coil 107 has a coil winding axis in the Z-direction, and is wound substantially in a rectangular shape so that current flows in the X-direction and in the Y-direction.

The tracking coil 108a is fixed to a wall surface parallel to the XZ-plane of the lens holder 106, and the tracking coil 108b is fixed to the other wall surface parallel to the XZ-plane of the lens holder 106. Each of the tracking coils 108a and 108b has a coil winding axis in the Y-direction, and is wound substantially in a rectangular shape so that current flows in the X-direction and in the Z-direction.

Tilt coils 109a and 109b are fixed to the bottom surface of the lens holder 106 (i.e., the wall surface parallel to the XY-plane) so that the tilt coils 109a and 109b are adjacent to each other in the X-direction. Each of the tilt coils 109a and 109b has a coil winding axis of the Z-direction, and is wound substantially in a rectangular shape so that current flows in the X-direction and in the Y-direction. The winding directions of the tilt coils 109a and 109b are opposite to each other.

The focusing coil 107, the tracking coils 108a and 108b and the tilt coils 109a and 109b are electrically connected to the wires 111a through 111f, and applied with electric current via the wires 111a through 111f and the board 112.

Magnetic pieces 110a and 110b are fixed to one of the wall surfaces parallel to the XZ-plane of the lens holder 106 so that the magnetic pieces 110a and 110b face the magnets 103a and 103b. Magnetic pieces 110c and 110d are fixed to the other of the wall surfaces parallel to the XZ-plane of the lens holder 106 so that the magnetic pieces 110c and 110d face the magnet 103c.

Figure 7A:
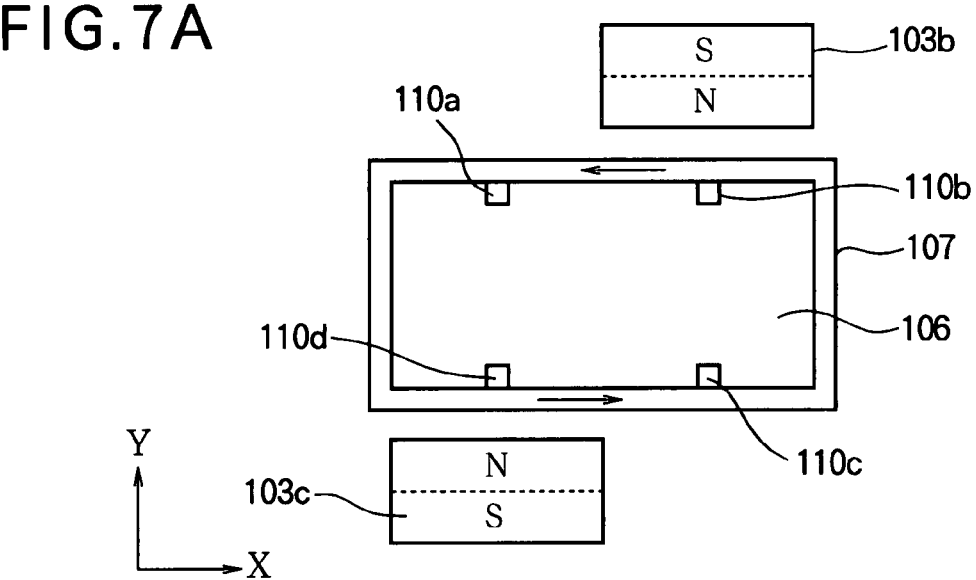
FIGS. 7A, 7B and 7C are schematic views showing an operation of the optical element driving apparatus according to Embodiment 1.
Figure 7B:
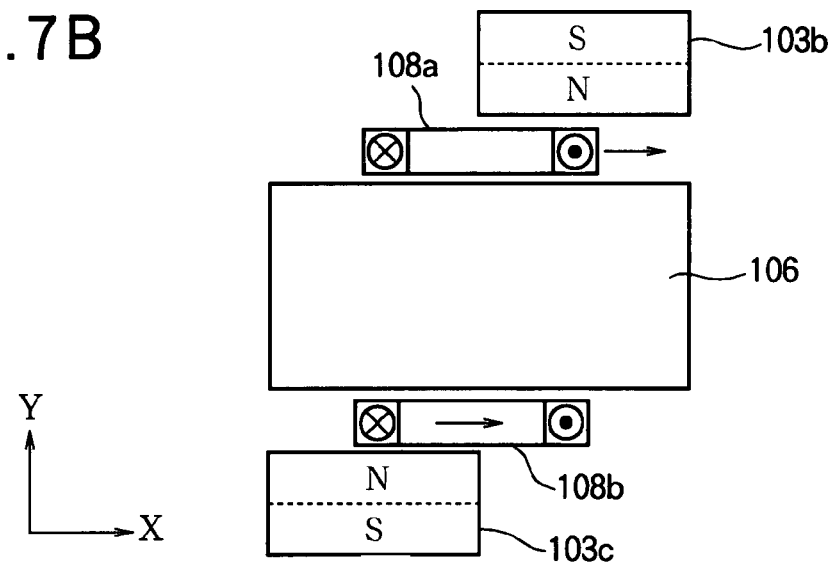
Figure 7C:
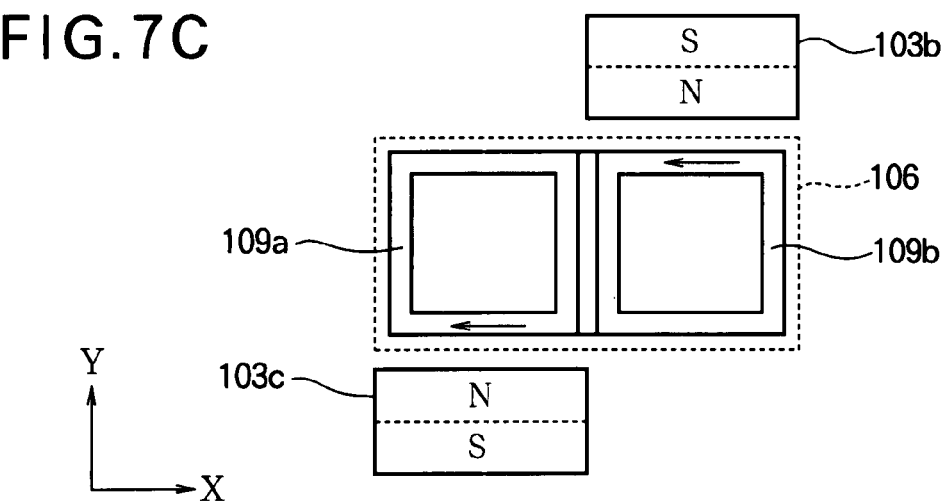

Next, the operation of the optical element driving apparatus according to Embodiment 1 will be described. First, the description will be made to the case where the objective lens 104 is selected (FIG. 1). FIGS. 7A, 7B and 7C are schematic views respectively for illustrating the focusing control, the tracking control and the tilt control. The magnetic poles (N-poles and S-poles) of the magnets 103b and 103c and the direction of the current shown in FIGS. 7A, 7B and 7C are merely an example.

In the case where the objective lens 104 is selected, the magnetic piece 110b faces the magnet 103b, and the magnetic piece 110d faces the magnet 103c. Therefore, a magnetic attractive force (i.e., a magnetic resilient force) is generated between the magnetic piece 110b and the magnet 103b and between the magnetic piece 110d and the magnet 103c. With the magnetic attractive force, the lens holder 106 is held at a position shown in FIG. 1.

As shown in FIG. 7A, portions of the focusing coil 107 through which current flows in the X-direction respectively face the magnets 103b and 103c. Further, as shown in FIG. 7B, portions of the tracking coils 108a and 108b through which the current flows in the Z-direction respectively face the magnets 103b and 103c. Further, as shown in FIG. 7C, portions of the tilt coils 109a and 109b through which the current flows in the X-direction respectively face the magnets 103b and 103c.

In this state, the focusing error, i.e., the displacement of the beam spot formed on the optical disk (not shown) in the focusing direction is detected by a conventional focusing sensor using an astigmatic method or the like. In accordance with the detected focusing error, current flows through the focusing coil 107. As shown in FIG. 7A, due to the interaction between the current flowing through the focusing coil 107 and the magnetic field of the magnets 103b and 103c, a driving force is generated in the Z-direction. With the driving force, the lens holder 106 moves in the Z-direction (i.e., the direction of the optical axis of the objective lens 104), and the objective lens 104 moves in the Z-direction, so that the focusing control is performed.

Further, the displacement of the beam spot from the intended track of the optical disk in the tracking direction is detected by a conventional tracking sensor using a differential push-pull method or the like. In accordance with the detected displacement in the tracking direction, current flows through the tracking coils 108a and 108b. As shown in FIG. 7B, due to the interaction between the current flowing through the tracking coils 108a and 108b and the magnetic field of the magnets 103b and 103c, a driving force is generated, which forces the lens holder 106 in the same direction along X-direction. With the driving force, the lens holder 106 moves in the X-direction, and the objective lens 104 moves in the X-direction (i.e., the tracking direction), so that the tracking control is performed.

Furthermore, the relative tilt angle between the optical disk and the objective lens 104 is detected. In accordance with the detected tilt angle, current flows through the tilt coils 109a and 109b. As shown in FIG. 7C, due to the interaction between the current flowing through the tilt coils 109a and 109b and the magnetic field of the magnets 103b and 103c, a driving force is generated, which forces the tilt coils 109a and 109b in directions opposite to each other along the Z-direction. With the driving force, the tilt angle of the lens holder 106 (i.e., the tilt angle about the axis of the Y-direction) changes, so that the tilt control is performed.

In order to switch from the objective lens 104 to the objective lens 105, current which is larger than that in the tracking control flows through the tracking coils 108a and 108b. Due to the interaction between the current flowing through the tracking coils 108a and 108b and the magnetic field of the magnets 103b and 103c, the lens holder 106 moves in the X-direction from the position shown in FIG. 1 to the position shown in FIG. 3, overcoming the above described magnetic resilient force.

With such an operation, the objective lens 105 moves to a position above the center of the base 101 in the X-direction, i.e., above the through hole 101e. Therefore, the recording of information on, the reproducing of information from, or both can be performed using the objective lens 105. In this state, the magnetic piece 110a faces the magnet 103a, and the magnetic piece 110c faces the magnet 103c. Therefore, due to the magnetic attractive force (i.e., the magnetic resilient force) between the magnetic piece 110a and the magnet 103a and between the magnetic piece 110c and the magnet 103c, the lens holder 106 is kept at the position shown in FIG. 3.

Furthermore, in a state shown in FIG. 3, the portions of the focusing coil 107 through which the current flows in the X-direction face the magnets 103a and 103c. The portions of the tracking coils 108a and 108b through which the current flows in the Z-direction face the magnets 103a and 103c. The portions of the tilt coils 109a and 109b through which the current flows in the X-direction faces the magnets 103a and 103c. Therefore, the focusing control, the tracking control and the tilt control can be performed in the same manner as when the objective lens 104 is selected.

In the above described operation of the optical element driving apparatus, a center of gravity of the movable part (including the lens holder 106) is at a center position between the objective lenses 104 and 105 in the horizontal plane (the XY-plane) and at a center position of the lens holder 106 in the vertical direction (Z-direction). When the objective lens 104 is selected as shown in FIG. 1, the resultant of the driving forces generated between the focusing coil 107 (through which the current flows) and the magnets 103b and 103c (facing the focusing coil 107) is applied to the above described position of the center of gravity. Further, when the objective lens 105 is selected as shown in FIG. 3, the resultant of the driving forces generated between the focusing coil 107 (through which the current flows) and the magnets 103a and 103c (facing the focusing coil 107) is applied to the above described position of the center of gravity.

The same applies to the tracking control. More specifically, when the objective lens 104 is selected as shown in FIG. 1, the resultant of the driving forces generated between the tracking coil 108a and the magnet 103b and between the tracking coil 108b and the magnet 103c is applied to the above described position of the center of gravity. Further, when the objective lens 105 is selected as shown in FIG. 3, the resultant of the driving forces generated between the tracking coil 108a and the magnet 103a and between the tracking coil 108b and the magnet 103c is applied to the above described position of the center of gravity.

In the above described operation of the optical element driving apparatus, the restoring force of the lens holder 106 is obtained by the resultant of the resilient (bending) force of the wires 111a through 111f and the above described magnetic attractive force (i.e., the magnetic resilient force).

As described above, in Embodiment 1 of the present invention, the switching of the objective lenses 104 and 105 can be performed by moving the holder 106 in the X-direction using the tracking driving unit (i.e., the tracking coils 108a and 108b and the magnets 103a through 103c). Therefore, it is not necessary to move the heavy weight components, with the result that the switching of the objective lenses 104 and 105 can be performed with a simple configuration. Since it is not necessary to provide an exclusive mechanism for switching the objective lenses 104 and 105, the cost of the components can be reduced, and the assembling process can be simplified.

Further, by utilizing the magnetic attractive force between the magnetic pieces 110a through 110d and the magnets 103a through 103c, it becomes possible to stably keep the objective lens 104 at a position shown in FIG. 1 and to stably keep the objective lens 105 at a position shown in FIG. 3.

Further, the magnets 103a through 103c are commonly used for both of the tracking control and the focusing control, and therefore the number of components can be reduced, and the cost of the optical element driving apparatus can be reduced.

Further, the driving force is applied to the position of the center of gravity of the movable part (i.e., the lens holder 106 and the components mounted thereon), and therefore the focusing control and the tracking control can be stably performed.

Further, the magnet 103a through 103c are disposed on both sides of the lens holder 106 in the Y-direction, the magnet 103b faces the respective coils in the case where the objective lens 104 is selected, the magnet 103a faces the respective coils in the case where the objective lens 105 is selected, and the magnet 103c faces the respective coils in both cases. Therefore, the volume of the magnets can be reduced, with the result that the optical element driving apparatus can be miniaturized and the cost thereof can be reduced.

Further, by the provision of the tilt coils 109a and 109b, it becomes possible to control the orientation of the objective lens for keeping the optical axis of the objective lens at right angle with respect to the recording surface of the optical disk (i.e., the tilt control).

Further, the lens holder 106 is supported by the wires 111a through 111f, and therefore the lens holder 106 can be supported so that the lens holder 106 is movable in the focusing and tracking directions and in the tilting direction. Furthermore, the wires 111a through 111f also function as a current supply unit, and therefore the number of components can be reduced, and the cost of the optical element driving apparatus can be reduced.

Embodiment 2

Figure 8A:
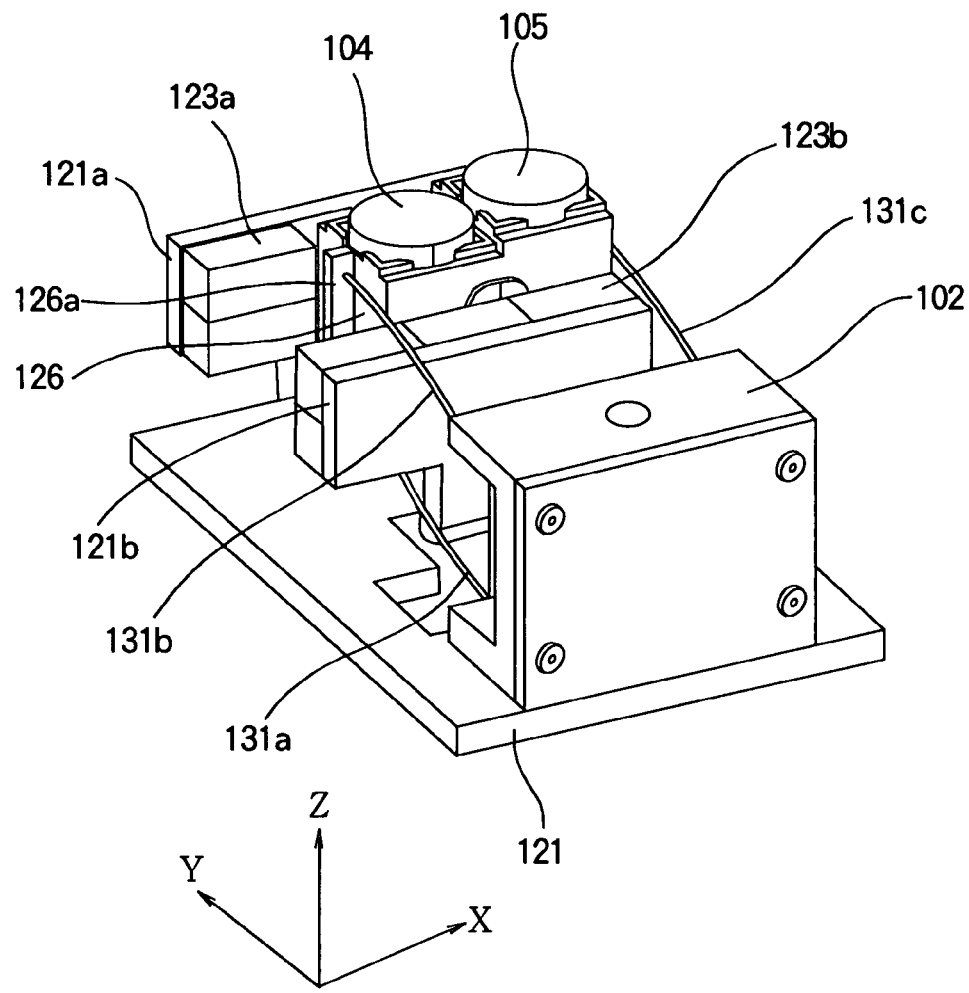
FIG. 8A is a perspective view showing an optical element driving apparatus according to Embodiment 2 of the present invention in a state where the optical element driving apparatus selects one of optical elements.
Figure 8B:
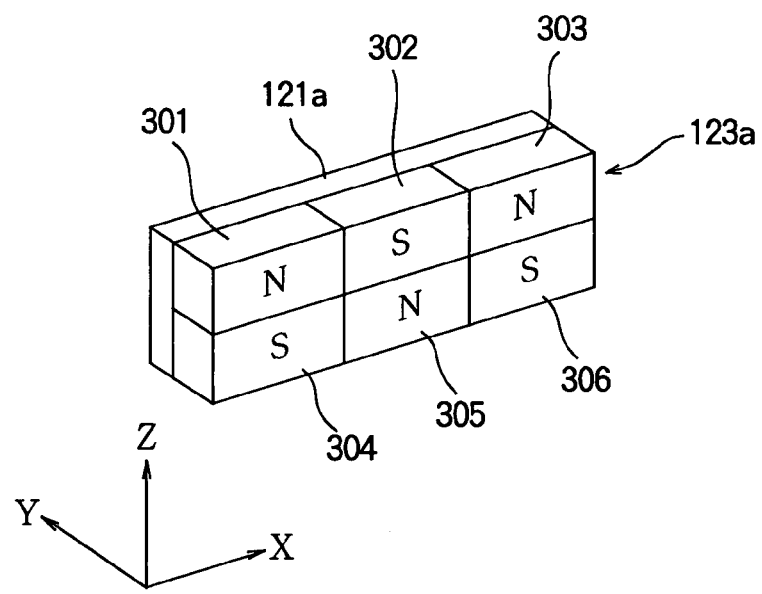
FIG. 8B is a perspective view showing an example of a magnet provided in the optical element driving apparatus shown in FIG. 8A.
Figure 9A:
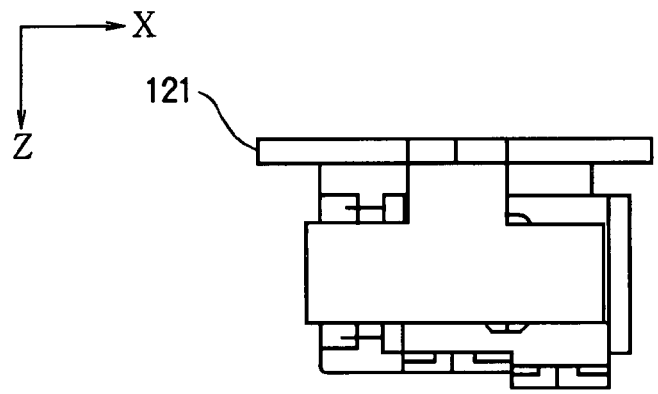
FIGS. 9A, 9B and 9C are respectively a front view, a side view and a plan view showing the optical element driving apparatus showing FIG. 8A.
Figure 9B:
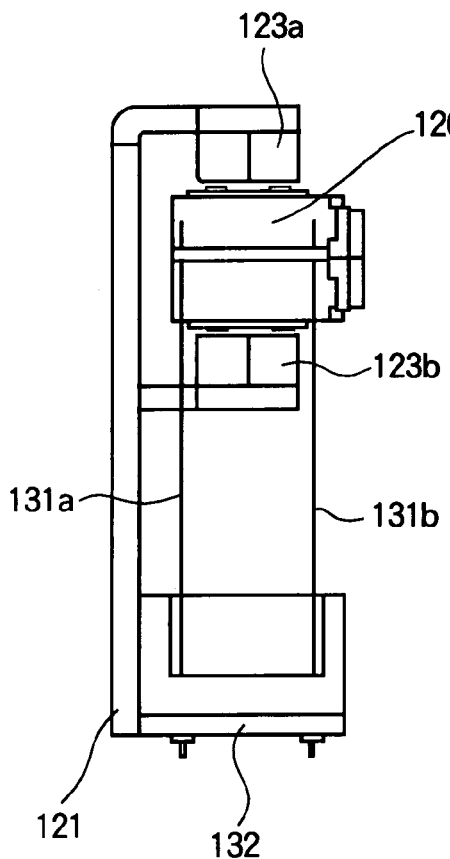
Figure 9C:
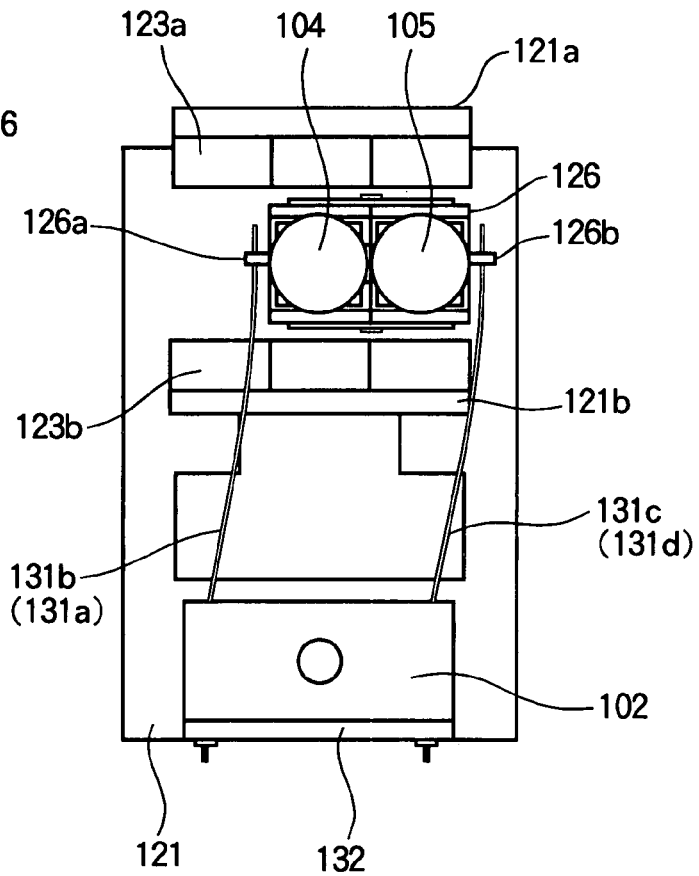
Figure 10:
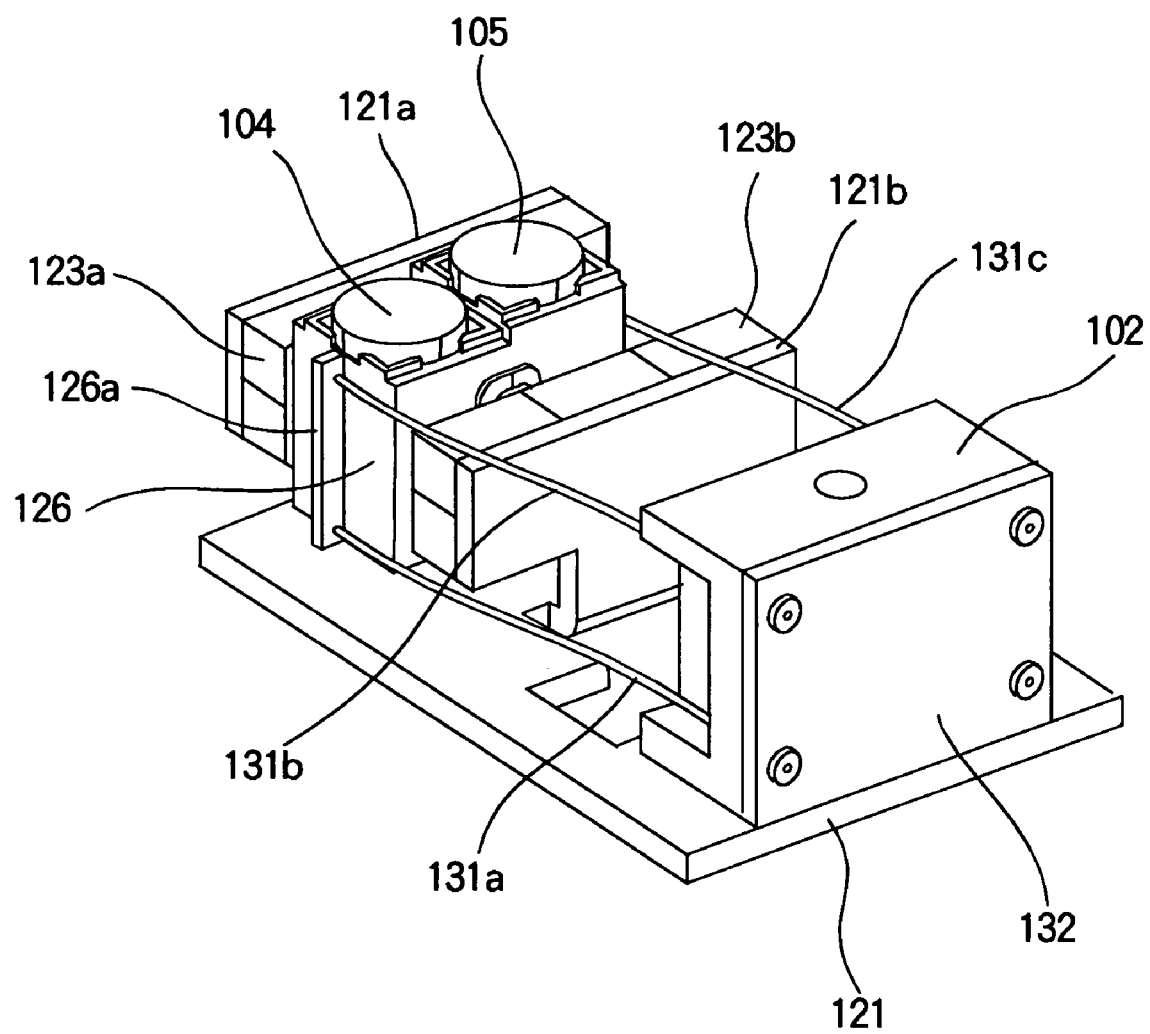
FIG. 10 is a perspective view showing the optical element driving apparatus according to Embodiment 2 of the present invention in a state where the optical element driving apparatus selects the other of the optical elements.
Figure 11A:
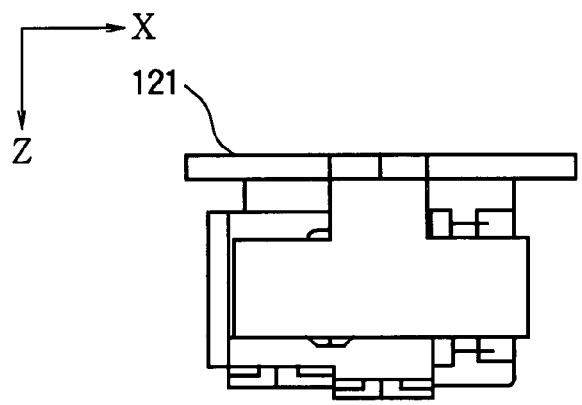
FIGS. 11A, 11B and 11C are respectively a front view, a side view and a plan view showing the optical element driving apparatus corresponding to FIG. 10.
Figure 11B:
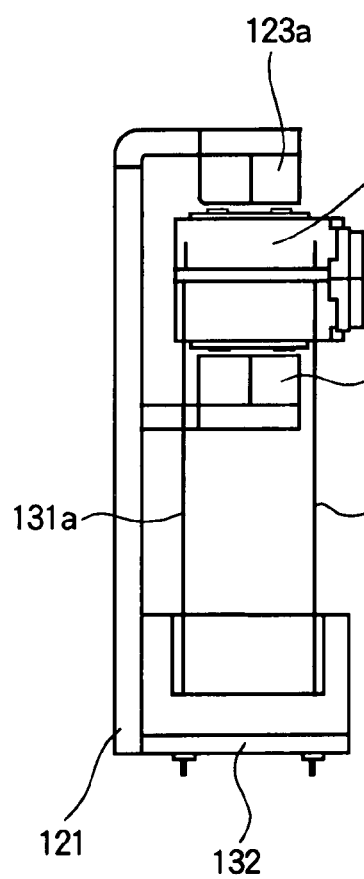
Figure 11C:
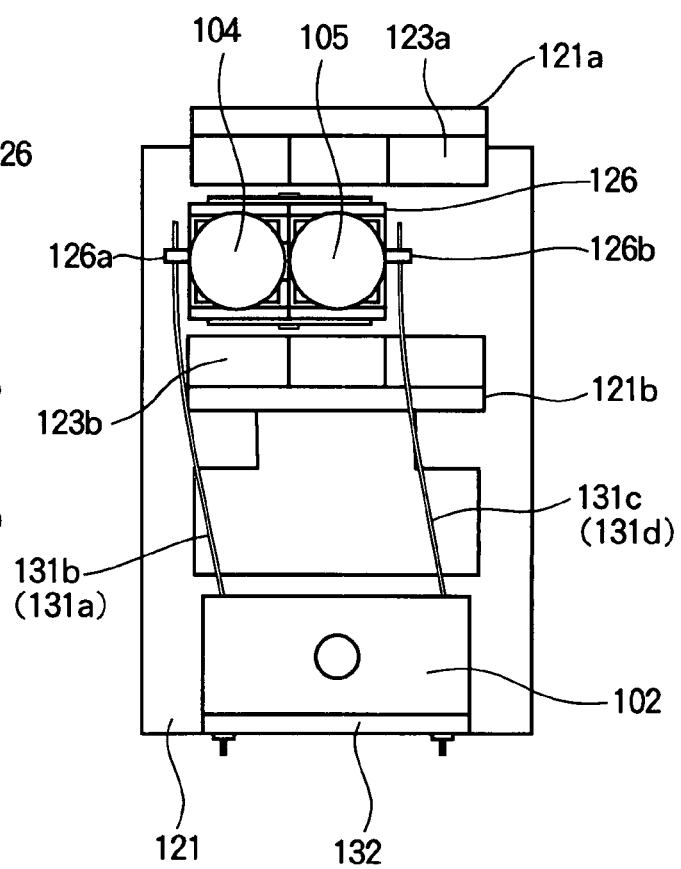
Figure 12:
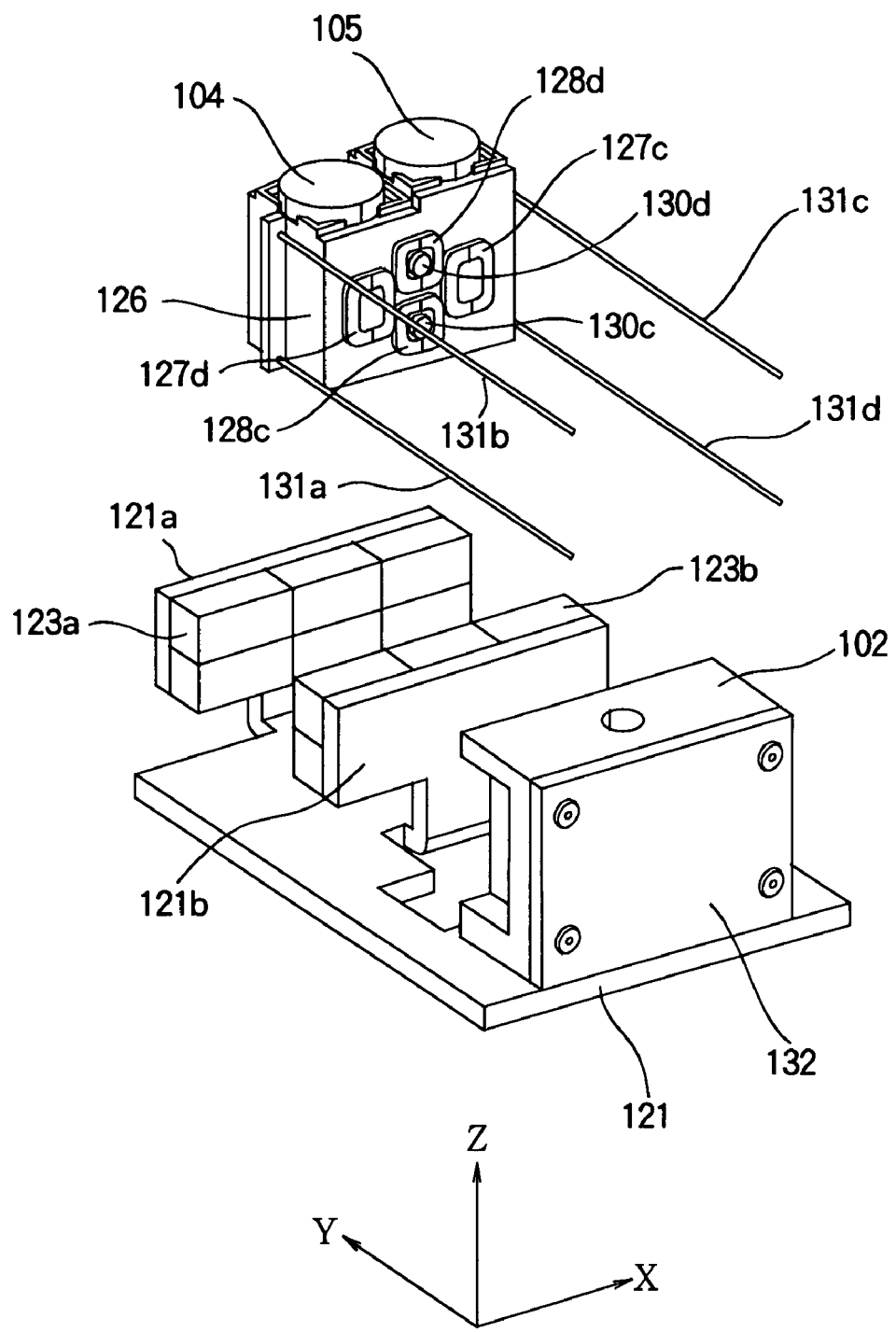
FIG. 12 is a perspective view showing the optical element driving apparatus shown in FIG. 8A in such a manner that the optical element driving apparatus is divided into a movable part and a stationary part.
Figure 13:
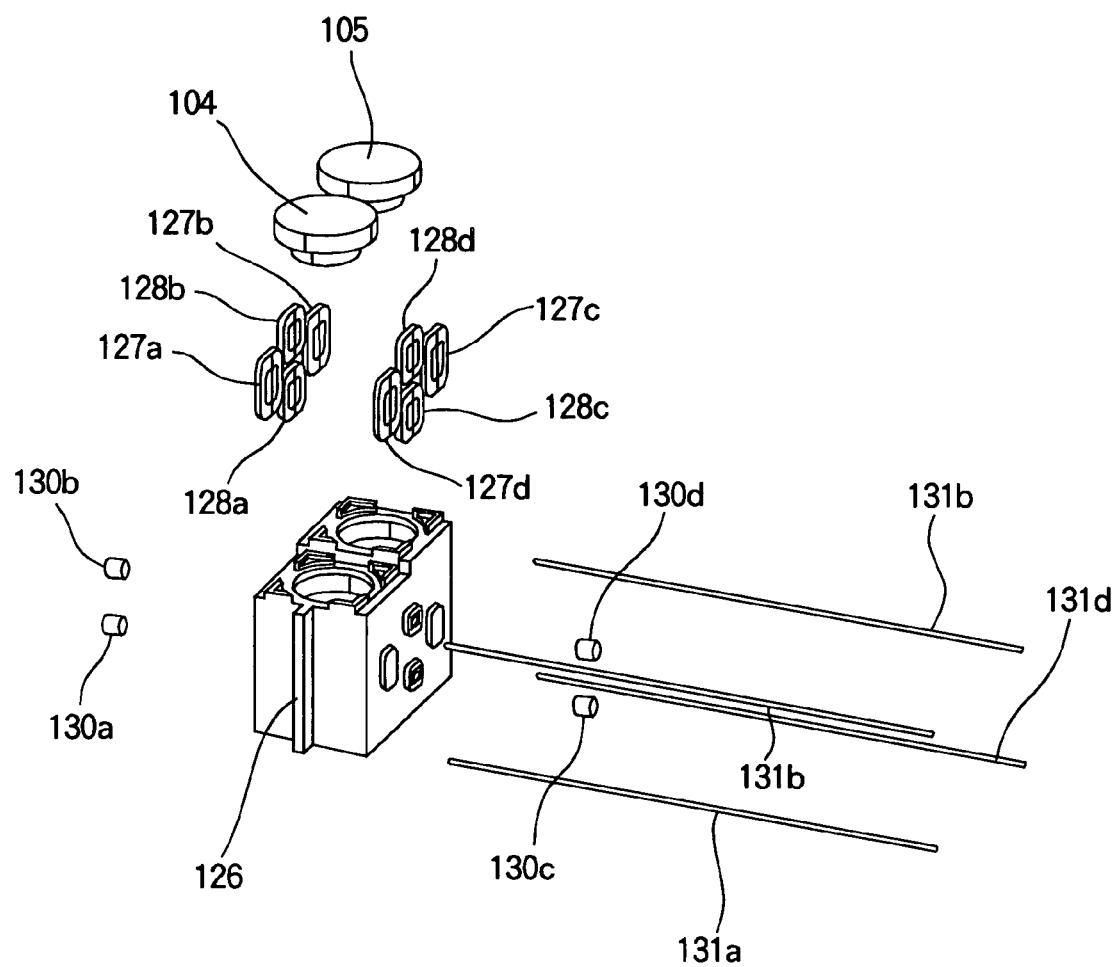
FIG. 13 is an exploded perspective view showing the movable part of the optical element driving apparatus shown in FIG. 12.

FIG. 8A is a perspective view showing an optical element driving apparatus according to Embodiment 2 of the present invention in a state where the optical element driving apparatus selects one of two optical elements. FIG. 8B is a perspective view showing a configuration example of a magnet of the optical element driving apparatus shown in FIG. 8A. FIGS. 9A, 9B and 9C are respectively a front view, a side view and a plan view of the optical element driving apparatus shown in FIG. 8A. FIG. 10 is a perspective view showing the optical element driving apparatus shown in FIG. 8A in a state where the optical element driving apparatus selects the other of the optical elements. FIGS. 11A, 11B and 11C are respectively a front view, a side view and a plan view of the optical element driving apparatus corresponding to FIG. 10. FIG. 12 is a perspective view showing the optical element driving apparatus shown in FIG. 8A in such a manner that the optical element driving apparatus is divided into a movable part and a stationary part. FIG. 13 is an exploded perspective view showing the movable part of the optical element driving apparatus shown in FIG. 12. In FIGS. 8A through 13, the components that are the same as those of Embodiment 1 are assigned the same reference numerals.

As shown in FIG. 8A, in Embodiment 2, two magnets 123a and 123b are disposed on both sides of the lens holder 126 in the Y-direction. The magnets 123a and 123b are elongated in the X-direction. Each of the magnets 123a and 123b has a length that cover a movable range of the lens holder 126 in the X-direction (for example, 1.5 times the length of the lens holder 126 in the X-direction). The magnets 123a and 123b have magnetic pole-surfaces facing each other, and the magnetic pole-surfaces are parallel to the XZ-plane. Each of the facing surfaces of the magnets 123a and 123b is divided into six areas (i.e., magnetic pole-surfaces) in total, i.e., three in the X-direction and two in the Y-direction. The magnets 123a and 123b are multipolar magnetized so that adjacent magnetic pole-surfaces have opposite polarities.

As shown in FIG. 8B, the magnet 123a has, for example, three magnetic pole-surfaces 301, 302 and 303 arranged in the X-direction on the upper part (+Z side) and three magnetic pole-surfaces 304, 305 and 306 arranged in the X-direction on the lower part (−Z side). The magnetic pole-surfaces 301, 302 and 303 of the magnet 123a are magnetized to, for example, N-pole, S-pole and N-pole in this order. The magnetic pole-surfaces 304, 305 and 306 of the magnet 123a are magnetized to, for example, S-pole, N-pole and S-pole in this order. The other magnet 123b has the multipolar structure divided in a similar manner to the magnet 123a. The magnetic poles (N-poles and S-poles) of the magnets 123a and 123b shown in FIG. 8B are merely an example.

As shown in FIG. 8A, the base 121 has fixing walls 121a and 121b formed upright in such a manner that the magnets 123a and 123b can be fixed to the fixing walls 121a and 121b. The fixing walls 121a and 121b include intermediate portions of narrower widths (dimensions in the X-direction) between the base 121 and the portions of the fixing walls 121a and 121b supporting the magnets 123a and 123b.

As shown in FIG. 9A through 9C, the lens holder 126 is substantially in the shape of a rectangular parallelepiped. Four wires 131a, 131b, 131c and 131d are fixed to both ends (in the X-direction) of the lens holder 126 so that two wires are fixed to each end of the lens holder 126. The wires 131a and 131b are arranged in the Z-direction, and tip ends of the wires 131a and 131b are fixed to a protrusion 126a formed on an end surface (in the X-direction) of the lens holder 126. Tail ends of the wires 131a and 131b are fixed to a board 132 fixed to the support 102. Similarly, the wires 131c and 131d are arranged in the Z-direction, and tip ends of the wires 131c and 131d are fixed to a protrusion 126b formed on the other end surface (in the X-direction) of the lens holder 126. Tail ends of the wires 131c and 131d are fixed to the board 132 fixed to the support 102. The lens holder 126 is supported by the wires 131a through 131d with respect to the support 102.

By the resilient deformation of the wires 131a through 131d, the lens holder 126 is movable substantially in the X-direction between a position shown in FIG. 8 and a position shown in FIG. 10. When the lens holder 126 is in the position shown in FIG. 8, the recording of information on the optical disk, the reproducing of information from the optical disk, or both can be performed using the objective lens 104. When the lens holder 126 is in the position shown in FIG. 10, the recording of information on the optical disk, the reproducing of information from the optical disk, or both can be performed using the objective lens 105.

As shown in FIG. 13, focusing coils 127a, 127b, 127c and 127d are provided on two sides of the lens holder 126 parallel to the XZ-plane so that two focusing coils are provided on each side of the lens holder 126. Among the focusing coils 127a through 127d, the focusing coils 127a and 127b are fixed to one side of the lens holder 126 (i.e., a far side from the support 102) parallel to the XZ-plane so that the focusing coils 127a and 127b are arranged in the X-direction. Similarly, the focusing coils 127c and 127d are fixed to the other side of the lens holder 126 (i.e., a near side from the support 102) parallel to the XZ-plane so that the focusing coils 127c and 127d are arranged in the X-direction. Each of the focusing coils 127a through 127d has a coil winding axis in the Y-direction, and is so wound that the current flows in the X-direction and in the Z-direction.

The tracking coils 128a, 128b, 128c and 128d are provided on two sides of the lens holder 126 parallel to the XZ-plane so that two tracking coils are provided on each side of the lens holder 126. Among the tracking coils 128a through 128d, the tracking coils 128a and 128b are fixed to the lens holder 126 so that the tracking coils 128a and 128b are disposed between the focusing coils 127a and 127b in the X-direction and so that the tracking coils 128a and 128b are arranged in the Z-direction. The tracking coils 128c and 128d are fixed to the lens holder 126 so that the tracking coils 128c and 128d are disposed between the focusing coils 127c and 127d in the X-direction and so that the tracking coils 128c and 128d are arranged in the Z-direction. Each of the tracking coils 128a through 128d has a coil winding axis in the Y-direction, and is so wound that the current flows in the X-direction and in the Z-direction.

The optical element driving apparatus of Embodiment 2 is configured to perform the focusing control and the tracking control, but does not perform the tilt control. Therefore, the optical element driving apparatus of Embodiment 2 has no tilt coil.

Four magnetic pieces 130a, 130b, 130c and 130d are provided on two sides of the lens holder 126 parallel to the XZ-plane so that two magnetic pieces are provided on each side of the lens holder 126. Among the magnetic pieces 130a through 130d, the magnetic pieces 130a and 130b are respectively disposed inside the windings of the tracking coils 128a and 128b, and the magnetic pieces 130c and 130d are respectively disposed inside the windings of the tracking coils 128c and 128d.

Next, the operation of the optical element driving apparatus according to Embodiment 2 will be described. First, the description will be made to the case where the objective lens 104 is selected (FIG. 8). FIG. 14 is a schematic view showing the positional relationship between the magnets 123a and 123b and the respective coils. In the case where the objective lens 104 is selected, the magnetic pieces 130a and 130b provided on the lens holder 126 (omitted in FIG. 14) respectively face a borderline between the magnetic pole-surfaces 305 and 306 and a borderline between the magnetic pole-surfaces 302 and 303 of the magnet 123a. Similarly, the magnetic pieces 130c and 130d provided on the lens holder 126 respectively face a borderline between the magnetic pole-surfaces 305 and 306 and a borderline between the magnetic pole-surfaces 302 and 303 of the magnet 123b.

Two portions of the focusing coil 127a through which the current flows in the X-direction respectively face the magnetic pole-surfaces 302 and 305 of the magnet 123a whose polarities are opposite to each other. Two portions of the focusing coil 127b through which the current flows in the X-direction respectively face the magnetic pole-surfaces 303 and 306 of the magnet 123a whose polarities are opposite to each other. Similarly, two portions of the focusing coil 127c through which the current flows in the X-direction respectively face the magnetic pole-surfaces 303 and 306 of the magnet 123b whose polarities are opposite to each other. Two portions of the focusing coil 127d through which the current flows in the X-direction respectively face the magnetic pole-surfaces 302 and 305 of the magnet 123b whose polarities are opposite to each other.

Further, two portions of the tracking coil 128a through which the current flows in the Z-direction respectively face the magnetic pole-surfaces 305 and 306 of the magnet 123a whose polarities are opposite to each other. Two portions of the tracking coil 128b through which the current flows in the Z-direction respectively face the magnetic pole-surfaces 302 and 303 of the magnet 123a whose polarities are opposite to each other. Similarly, two portions of the tracking coils 128c through which the current flows in the Z-direction respectively face the magnetic pole-surfaces 305 and 306 of the magnet 123b whose polarities are opposite to each other. Two portions of the tracking coil 128d through which the current flows in the Z-direction respectively face the magnetic pole-surfaces 302 and 303 of the magnet 123b whose polarities are opposite to each other.

In this state, the focusing error, i.e., the displacement of the beam spot formed on the optical disk (not shown) in the focusing direction is detected by a conventional focusing sensor using an astigmatic method or the like. In accordance with the detected focusing error, current flows through the focusing coil 127a through 127d. Due to the interaction between the current flowing through the focusing coils 127a and 127b and the magnetic field of the magnet 123a, and due to the interaction between the current flowing through the focusing coils 127c and 127d and the magnetic field of the magnet 123b, a driving force is generated in the Z-direction. With the driving force, the lens holder 126 moves in the Z-direction (i.e., the direction of optical axis of the objective lens 104), and the objective lens 104 moves in the Z-direction, so that the focusing control is performed.

Further, the displacement of the beam spot from the intended track of the optical disk in the tracking direction is detected by a conventional tracking sensor using a differential push-pull method or the like. In accordance with the detected displacement in the tracking direction, current flows through the tracking coils 128a through 128d. Due to the interaction between the current flowing through the tracking coils 128a and 128b and the magnetic field of the magnet 123a, and due to the interaction between the current flowing through the tracking coils 128c and 128d and the magnetic field of the magnet 123b, a driving force is generated, which moves the lens holder 126 in the X-direction. With the driving force, the lens holder 126 moves in the X-direction, and the objective lens 104 moves in the X-direction (i.e., the tracking direction), so that the tracking control is performed.

In order to switch from the objective lens 104 to the objective lens 105, current which is larger than that in the tracking control flows through the tracking coils 128a through 128d. Due to the interaction between the current flowing through the tracking coils 128a and 128b and the magnetic field of the magnet 123a, and due to the interaction between the current flowing through the tracking coils 128c and 128d and the magnetic field of the magnet 123b, the lens holder 126 moves in the X-direction from the position shown in FIG. 8 to the position shown in FIG. 10, overcoming the above described magnetic resilient force.

In this state, the magnetic pieces 130a and 130b respectively face a borderline between the magnetic pole-surfaces 304 and 305 and a borderline between the magnetic pole-surfaces 301 and 302 of the magnet 123a. Similarly, the magnetic pieces 130c and 130d respectively face a borderline between the magnetic pole-surfaces 304 and 305 and a borderline between the magnetic pole-surfaces 301 and 302 of the magnet 123b.

Further, two portions of the focusing coil 127a through which the current flows in the X-direction respectively face the magnetic pole-surfaces 301 and 304 of the magnet 123a. Two portions of the focusing coil 127b through which the current flows in the X-direction respectively face the magnetic pole-surfaces 302 and 305 of the magnet 123a. Similarly, two portions of the focusing coil 127c through which the current flows in the X-direction face the magnetic pole-surfaces 302 and 305 of the magnet 123b. Two portions of the focusing coil 127d through which the current flows in the X-direction face the magnetic pole-surfaces 301 and 304 of the magnet 123b.

Two portions of the tracking coil 128a through which the current flows in the Z-direction respectively face the magnetic pole-surfaces 304 and 305 of the magnet 123a, and two portions of the tracking coil 128b through which the current flows in the Z-direction respectively face the magnetic pole-surfaces 301 and 302 of the magnet 123a. Similarly, two parts of the tracking coil 128c through which the current flows in the Z-direction respectively face the magnetic pole-surfaces 304 and 305 of the magnet 123b, and two portions of the tracking coil 128d through which the current flows in the Z-direction respectively face the magnetic pole-surfaces 301 and 302 of the magnet 123b.

Therefore, the focusing control, the tracking control and the tilt control can be performed in the same manner as when the objective lens 104 is selected.

In Embodiment 2 of the present invention, as was described in the above described Embodiment 1, it is not necessary to move the heavy weight components, with the result that the switching of the objective lenses 104 and 105 can be performed with a simple configuration. Further, the tracking driving unit is also used as a mechanism for switching the objective lenses 104 and 105, and therefore the cost of the components can be reduced, and the assembling process can be simplified.

Additionally, in Embodiment 2, the magnets 123a and 123b are multipolar magnetized, and therefore it is possible to enhance the use efficiency of the respective coils.

In Embodiment 2, the description has been made to the optical element driving apparatus that performs only the focusing control and the tracking control. However, it is also possible that the optical element driving apparatus further performs the tilt control. In such a case, two tilt coils (having portions through which the current flows in the X-direction) are provided in the lower part of the lens holder 126 so that the tilt coils oppose the magnets 123a and 123b. Further, two resilient bodies are provided between the lens holder 126 and the board 132 in addition to the wires 131a through 131d, and the two resilient bodies are electrically connected to the respective tilt coils. With such an arrangement, the tilt angle of the lens holder 126 in the X-direction, so that the tilt control is performed.

In the above described Embodiments 1 and 2, the optical element driving apparatus is configured to switch two objective lenses 104 and 105. However, the number of the switchable objective lenses is not limited to two, but can be three or more. Furthermore, the optical element driving apparatus can be configured to perform the switching of other optical elements than objective lenses. In addition, the recording medium is not limited to blu-ray disk, DVD or the like, but other recording medium can be used.

While the preferred embodiments of the present invention have been illustrated in detail, it should be apparent that modifications and improvements may be made to the invention without departing from the spirit and scope of the invention as described in the following claims.

What is claimed is:

1. An optical element driving apparatus comprising:
a holder that holds a plurality of switchable optical elements for focusing light on a recording medium, said holder having a magnetic body;
a supporting unit that supports said holder, said supporting unit being resiliently deformable;
a focusing driving unit that drives said holder in a direction of optical axes of said optical elements, and
a tracking driving unit that drives said holder in a tracking direction perpendicular to said direction of said optical axes,
wherein the switching of said optical elements is performed by moving said holder by means of said tracking driving unit, so as to select one of said optical elements that focuses light on said recording medium,
wherein said tracking driving unit includes:
a coil fixed to said holder,
first and second magnets arranged in said tracking direction so that said first or second magnet faces said coil in a state where either of said two optical elements is selected, and
a third magnet disposed on a side opposite to said first and second magnets with respect to said holder so that said third magnet faces said coil in a state where either of said two optical elements is selected, and
wherein said first, second and third magnets and said magnetic body of said holder cause a magnetic interaction by which said optical elements are kept at a position where one of said optical elements focuses light on said recording medium.

2. The optical element driving apparatus according to claim 1, wherein said tracking driving unit and said focusing driving unit use said magnet in common.

3. The optical element driving apparatus according to claim 2, wherein at least one said magnet is provided on each side of said holder in a direction perpendicular to both of said direction of said optical axes and said tracking direction.

4. The optical element driving apparatus according to claim 1, wherein said magnet has a magnetic pole-surface facing said holder, and said magnetic pole-surface is multipolar magnetized in said tracking direction.

5. The optical element driving apparatus according to claim 1, wherein a driving force generated by said focusing driving unit and a driving force generated by said tracking driving unit are applied to a position of a center of gravity of a movable part including said holder and said optical elements.

6. The optical element driving apparatus according to claim 1, wherein said supporting unit comprises a plurality of wires connected to said holder.

7. The optical element driving apparatus according to claim 6, wherein said plurality of wires also function as a current supplying unit that supplies current to respective coils of said focusing driving unit and said tracking driving unit.

8. The optical element driving apparatus according to claim 1, further comprising a tilting unit that changes a tilt angle of said optical elements with respect to said recording medium by rotating said holder about an axis perpendicular to both of said direction of said optical axes and said tracking direction.

* * * * *